Oct. 2, 1962
J. A. DUKE
3,056,297
PRESSURE SIGNAL MEASURING APPARATUS
Filed Oct. 21, 1958
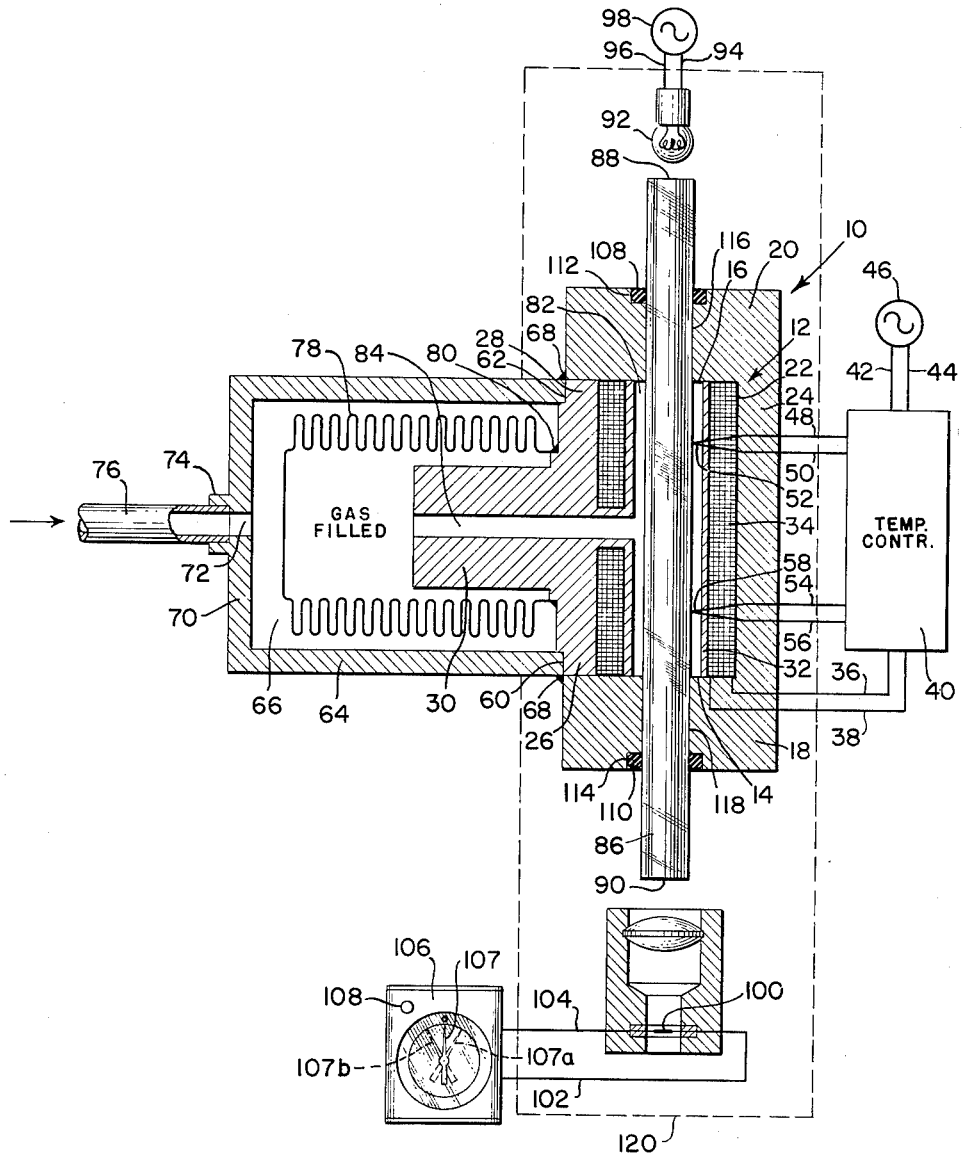
INVENTOR.
JOHN A. DUKE
BY
Arthur H. Swanson
ATTORNEY.

United States Patent Office 3,056,297
Patented Oct. 2, 1962

3,056,297
PRESSURE SIGNAL MEASURING APPARATUS
John A. Duke, Roslyn, Pa., assignor to Minneapolis-Honeywell Regulator Company, Minneapolis, Minn., a corporation of Delaware
Filed Oct. 21, 1958, Ser. No. 768,681
14 Claims. (Cl. 73—398)

This application relates to a transducing apparatus to convert the magnitude of a fluid pressure signal into an electrical signal whose value is of some preselected desired function of this fluid pressure signal.

Another more specific object of the present invention is to provide an apparatus of the aforementioned type wherein the pressure of a fluid signal to be measured is used to change the density of a compressible fluid surrounding a guide that is transmitting radiant energy between one location and another so that the index of refraction and absorption characteristic of this guide, and hence the amount of energy that the guide is able to transmit, will be changed in accordance with changes occuring in the magnitude of the pressure of the fluid signal.

Still another specific object of the present invention is to provide a transducing apparatus of the aforementioned type which can readily be reproduced, which has a high degree of accuracy, which possesses indefinite resolution, which has no hysteresis, and which has an indefinite life.

This application along with my copending United States patent application, Serial No. 753,570 filed by James Vollmer and myself, John A. Duke, and which is assigned to the same assignee, each measures the index of refraction and absorption characteristics of a substance surrounding a radiant energy guide or rod member. Although this application and the aforementioned referred to application of James Vollmer and myself discloses certain common principles upon which measurements of these substances may be acquired this application differs from that of the Vollmer et al. application in that it discloses a characterized radiant energy rod arrangement which is particularly adapted to measure variations in pressure of a fluid as will be hereinafter described. The Vollmer et al. application, on the other hand, discloses a radiant energy guide which is particularly adapted to measure the specific gravity and/or composition of a fluid.

A still more specific object of the invention is to thus provide an inexpensive apparatus which will accurately and instantaneously measure the magnitude of a fluid pressure by making a continuous measurement of the index of refraction and absorption characteristics of a fluid which is compressed against a guide rod by the aforementioned fluid pressure.

The drawing shows a fluid pressure to an electrical signal transducing apparatus.

Referring now to the drawing in detail, the pressure to electrical signal transducing apparatus is generally designated by reference numeral 10. This apparatus includes a housing 12. The inner wall surface 14 and 16 of a cylindrical right and left end wall portions 18, 20 of this housing 12 along with the inner wall surface 22 of a centrally located wall portion 24, which provides another part of the housing 12, are shown forming an aperture into which a portion that extends between the upper two ends 26, 28 of a T-shaped fitting 30 is positioned. This housing 12 may be made integral metal as shown or if preferred may be made in two half pieces which when assembled may be joined together at their ends.

The upper longitudinal part of this T fitting 30 is shown having a first chamber formed partially by the wall of the cylindrical sleeve 32 and partially by the ends 26, 28 of this fitting. On the outer cylindrical surface of this sleeve 32 there is mounted a substantially cylindrical electrical heating coil 34. One end of a pair of conductors 36, 38 are connected to a temperature controller 40. This controller 40 is in turn connected by way of conductors 42, 44 to a suitable power source 46. The controller 40 is also connected in a conventional fashion by the conductors 48, 50 to a first thermocouple 52 and by conductors 54, 56 to a second thermocouple 58.

The lower portion of the ends 26, 28 of the T fitting 30 are shown having a cylindrical grooved-out portion 60, 62 therein into which the entire upper cylindrical wall portion 64, that forms a second chamber 66, is inserted. The upper outer peripheral surface of this cylindrical wall portion 64 is connected to the inner surface of the right and left wall portions 18, 20, 24 by any suitable connecting means such as by a welding material 68.

The lower end of the second chamber 66 is provided with a wall portion 70 having an inlet passageway 72 therein. The lower end wall portion of this second chamber 66 is shown having an embossed sleeve portion 74 into which the upper end of the inlet conduit 76 may be fixedly connected.

The arrow pointing in a left to right direction represents the direction in which a fluid, whose pressure is to measured, is being applied to the second chamber 66. Located within this second chamber 66 there is shown a bellows 78 the upper end portion of which is secured by a suitable connecting means such as by the welding material 80 to the T 30.

A compressible fluid 82 which can be in the form of a compound such as carbon dioxide, $CO_2$, or in the form of an element such as hydrogen, $H_2$, or oxygen, $O_2$, is contained within the space that is formed by the interior of the bellows 78, a cylindrical passageway 84 in the inner wall of the T 30 and the first chamber within the confines of the sleeve 32 and the inner walls 14, 16 of the housing ends 18, 20.

Mounted in the cylindrical side walls 18, 20 of the housing 12 and extending through the first chamber formed by the sleeve 32 and side walls 18, 20, there is shown a radiant energy guide 86, such as for instance an optically smooth sapphire rod. However, in certain instances where gases other than those noted supra are used it may be equally beneficial to use other refractive rod material such as quartz or Pyrex in lieu of sapphire.

Although the ends 88 and 90 of the sapphire rod 86 are shown extending to the right and left ends of the housing 12, it is also conceivable under the present invention that it may be desirable to make these ends flush with the outer surfaces of the right and left wall portions 18, 20 where this transducing apparatus is required to be installed in an area where space is at a premium.

Disposed adjacent the end 88 of sapphire guide 86 is a source of radiant energy such as, for instance, a light bulb 92 which is energized by way of the conductors 94, 96 connected to an electrical power source 98. Adjacent the end 90 of the sapphire rod 86 is a radiant energy detecting device such as, for instance, a thermopile 100 which is connected by way of a pair of conductors 102, 104 to a meter 106.

Specifically the thermopile 100 illustrated in the drawing is basically a thermopile of the type that is disclosed in the Harrison et al. U.S. Patent No. 2,357,193 and which is in extensive commercial use in radiation pyrometers manufactured and sold by applicant's assignee.

This meter 106 is of the commercially available type commonly referred to as a null balance indicator. The internal component parts of this null balance indicator 106 is of a type similar to those disclosed in the W. P.

Wills Patent 2,423,540 filed December 1, 1941, issued July 8, 1947.

The pointer 107 of this indicator 106 is shown in a zero twelve o'clock null position or a position in which the pressure to be measured has compressed the bellows 78 a predetermined amount, that is, between a fully compressed position and a fully expanded position.

The dotted line position of this pointer 107a that is pointing to an indicating scale position that is clockwise and to the right of this twelve o'clock null position, indicates a position to which the pointer 107 will be moved when the bellows 78 has been expanded beyond the predetermined amount referred to supra.

In a similar manner the dotted line position 107b that is pointing to an indicating scale position that is counterclockwise and to the left of the twelve o'clock null position, indicates a position to which the pointer 107 will be moved when the bellows 78 has been allowed to be compressed further than the predetermined amount referred to supra.

A sealing means such as O-rings 108, 110 are shown retained in their respective circular recesses 112, 114 formed in the housing 12 in order to make the first chamber formed by the walls 18, 20, and sleeve 32 absolutely gas tight. It can readily be seen from the drawing that these O-rings 108, 110 can prevent the gas 82, that is within the first chamber walls 18, 20, 32, from seeping through any non-air tight space that may be present between the guide 86 and the wall forming aperture 116 that is in surface to surface contact with the guide, and/or from seeping through any similar non-gas tight space that may be present between the guide 86 and the wall forming aperture 118 that is also in surface to surface contact with this guide.

The drawing further shows an enclosure 120 which is used for the purpose of eliminating any strayed light from an external source and any foreign material from being deposited on the exposed right and/or left ends of the guide 86.

Having described the construction of the pressure to electrical signal transducing apparatus 10 illustrated in the drawing, a description of the operation thereof will now be presented.

A fluid under pressure which is to be measured is applied in the direction of the arrow by way of the inlet conduit 76 against the interior of the second chamber 66 and to the exterior of the gas filled bellows 78. An increase in the pressure of this fluid will cause the bellows to be compressed and hence the molecules of the gas contained within this bellows 78 and within the passageway 84 and the interior of the walls of the first chamber 18, 20, 32 to be pressed into a smaller, confined space.

As the reduction in volume of this space allowed for the gas 82 is reduced in the aforementioned manner, the density of this gas will be changed from a very low value that exists at ordinary pressures of this gas to an increasingly higher value as the pressure of the fluid acting on the external surface of the bellows 78 is increased. This increase in the density of the gas will continue until an equilibrium point is reached in which the pressure of the gas 82 reaches a value that is equal to that of the pressure of the fluid acting on the external surface of the bellows 78. In a similar but reverse manner the density of the gas 82 will be reduced to a very low value as the pressure of the fluid acting on the external surface of bellows 78 is reduced to an ordinary pressure value.

As the density of the gas 82, being applied to the external surface of the guide 86, is raised or lowered in the aforementioned manner, due to changes in the magnitude of the pressure of the fluid acting on the external surface of the bellows 78, the amount of radiant energy which the constant radiant energy source 92 will then transmit to thermopile 100 will be varied in accordance with the magnitude of the density change that is taking place from one instant of time to another. The reason for this is due to changes which occur in the index of refraction and the absorption coefficient which occur between the guide rod 86 and the gas 82 as will be hereinafter described.

Experimentation with many different types of gases have indicated that there are three conditions under which energy exiting from the guide may be made to vary, namely; variations in the relative index of refraction; variations in the absorption spectrum of the gas over the range of wavelengths emitted by the source and transmitted by the guide; and thirdly, the combination of the two previously mentioned conditions. Since the third condition can readily be described in terms of the first and second condition only the first and second conditions will hereinafter be described.

As the gas 82 is brought into contact with the guide 86 a greater or less quantity of internally reflected radiant energy will be refracted into this gas 82 from the guide depending on the relation that exists between the index of refraction of the gas 82 and the index of refraction of the guide. A material for the guide 86 is selected which has a suitably higher index of refraction than that of the gas 82 when the bellows 78 is compressed to an equilibrium point wherein the pounds per square inch of pressure that this gas reaches when it is equal the maximum pounds per square inch of pressure which the fluid to be measured will reach. By the aforementioned selecting technique a critical angle can be established between the guide and the gas.

As long as the incident angle, or angle at which the aforementioned internally reflected radiant energy hits the outer surface of the guide 86 that is within the first chamber is less that the aforementioned critical angle that has been established between the gas 82 and the guide 34, a portion of the radiant energy in this guide which reflected against the wall of this guide will thus be refracted out through this wall into the gas.

The amount of radiant energy that will be refracted and/or absorbed by the gas 82 over any given period of time will depend on the rate of speed at which this refracted energy can pass through this gas. If this gas 82 is made more dense then the index of refraction of this gas 82 will be raised closer to the index of refraction that was selected for the guide 86 and a new critical angle at which the internally reflected radiant energy can be refracted into the gaseous substance 82 will be established from that which was present before the increase in density of the gas took place. It is also obvious that as the density of this gas 82 is reduced the critical angle at which the reflected radiant energy will then be refracted into this fluid will be changed in a manner similar but opposite to that referred to supra.

After energy is in the guide and if the gas exhibits absorption bands in the region of wavelengths emitted by the source and transmitted by the guide, absorption energy losses will occur. These absorption losses are not attributed to an index of refraction affect as has been already explained in detail, since in the region of any absorption bands a totally real index of refraction is undefined. However, one way to describe these absorption losses is to assign a complex index of refraction of the form $n = n_0 + ik$ wherein $n$ = the complex index of refraction
$n_0$ = the real index of refraction
$k$ = the absorption coefficient
$i$ = the $\sqrt{-1}$ Thus, for those wavelengths over which the absorption coefficient $k$ is large, the reflectivity of the interface surface approaches zero. Therefore, variations in density which lead to variations in both the magnitude of $k$ and the range of wavelengths over which $k$ has an appreciable value, will thus result in variations in the absorption losses and hence, in the emergent losses.

The aforementioned radiant energy transmitting guide arrangement thus enables a predetermined amount of reflected radiant energy therein to be lost by refraction to a gas 82 whose density is continuously being varied which refractive loss will be increased or decreased depending on whether the index of refraction and/or absorption coefficient of the gas that surrounds the guide 86 is increasing or decreasing.

As the aforementioned loss in radiant energy that is being transmitted from its source 92 through the guide 86 is increased or decreased from a predetermined desired zero or null value, this change in radiant energy will be sensed by the thermopile 100. This thermopile 100 will then send a first electrical E.M.F. signal which is directly proportional to the change in the aforementioned lost energy that it receives from the right end of guide 86 to the null balance indicator 106 by way of the conductors 102, 104.

The null balance indicator 106 can be adjusted by initially setting the knob 108 to a position in which the pointer 107 will point to a selected twelve o'clock zero or null position when the fluid in the second chamber 66 whose pressure is to be measured reaches a pre-selected desired value at which time the bellows has reached a pre-selected partially compressed condition. Should the measured value of the fluid in chamber 66 exceed this pre-selected value the pointer 107 will move in a counter clockwise fashion away from the aforementioned twelve o'clock zero or null position slightly to the left of this position or in other words, to the pointer position 107b. This later pointer position will indicate to the operator the degree to which the fluid being applied to the bellows 78 in the second chamber 66 has exceeded the aforementioned desired null or zero indicating scale value when he observes the distance to which the pointer has moved in this down scale direction. In a similar but opposite manner it can readily be seen that should the aforementioned measured value of the fluid drop below this pre-selected null value the pointer 107 will move in a clockwise fashion away from the aforementioned zero or null position to some up scale position such as is indicated by reference numeral 107a. This latter pointer position will indicate to the operator the degree to which the fluid being applied to the bellows in the second chamber 66 has dropped below the aforementioned desired null value.

The temperature controller is employed to maintain the temperature of the gas 82 that is within the confines of the first chamber 18, 20, 32 at a predetermined value as the gas 82 is compressed or expanded from a predetermined partially compressed condition by the pressure of the fluid that is being applied to the external surface of the bellows 78.

The temperature controller 40 may be of a suitable commercially available type in which the temperature of the gas 82 is sensed by the thermocouples 52, 58 and the averaging out of these two sensed temperatures are used to control the amount of current being sent from an electric power supply 46, conductors 42, 44, the controller 40 and the conductors 36, 38 to the heating coil 34. It can thus be seen that this temperature controller is particularly useful when the pressure of the fluid being applied to the bellows, which is to be measured, reaches its maximum value and which causes these elastic molecules of the gas 82 to be brought into close proximity with one another.

This application concerns itself with the use of a radiant energy transmitting guide arrangement which enables a predetermined amount of reflected radiant energy therein to be lost by refraction to a gas 82 whose density is varied in response to variations in pressure of a fluid to be measured. This arrangement is also such that the refractive loss will be increased or decreased depending on whether the index of refraction and/or absorption coefficient of the gas that surrounds the guide 86 is increasing or decreasing.

What is claimed is:

1. A transducing apparatus to convert the magnitude of an input fluid pressure signal into a measurable electric signal, comprising a radiant energy conducting guide rod, a radiant energy source to direct radiant energy into a first end of said rod, an electrical radiant energy measuring means positioned at a second end of the rod responsive to radiant energy passing out of the second end of the rod, a first chamber surrounding a portion of the rod intermediate its ends and having a wall portion spaced from the outer peripheral portion of said rod, a flexible chamber operably connected by a passageway to said first chamber, a compressible fluid within said chambers and passageway, a third chamber surrounding and spaced from said flexible chamber, and means operable to apply said fluid pressure input signal to said third chamber to vary the pressure of the compressible fluid in accordance with the magnitude of the applied fluid pressure signal.

2. A transducing apparatus to convert the magnitude of an input fluid pressure signal into a measurable electric signal, comprising a radiant energy conducting guide rod, a radiant energy source to direct radiant energy into a first end and through said rod, an electrical radiant energy responsive means positioned to respond to radiant energy transmitted by said rod, a first chamber surrounding a portion of the rod intermediate its ends and having a wall portion spaced from the outer peripheral portion of said rod, a flexible chamber operably connected by a passageway to said first chamber, a compressible fluid within said chambers and passageway, a third chamber surrounding and spaced from said flexible chamber, and means operable to apply said fluid pressure input signal to said third chamber to thereby simultaneously apply a pressure to said flexible chamber and the compressible fluid retained therein in accordance with the magnitude of the applied fluid pressure signal.

3. An apparatus to convert the magnitude of a fluid pressure signal into an electrical signal whose magnitude is proportional to said fluid pressure signal, comprising a radiant energy source, an elongated radiant energy transmitting means, said source being operably positioned with respect to one end portion of said transmitting means to transmit radiant energy emitting therefrom into and through a first end of said transmitting means, a null balance indicator detector operably positioned adjacent the other end portion of said transmitting means, the detector being responsive to radiant energy passing therethrough, an electrical connection between the detector and the indicator operable to transmit an electrical signal to the indicator which is directly proportional to the intensity of the last-mentioned radiant energy, a fluid tight chamber having a wall portion thereof surrounding an elongated portion of said transmitting means, said wall portion having an aperture formed therein, a flexible member spaced from said aperture and having an outer peripheral portion thereof fixedly connected in fluid tight engagement to an outer surface of the wall portion of said chamber that surrounds said aperture a compressible fluid retained within said flexible member, said aperture and said fluid tight chamber, a second chamber spaced from and completely surrounding said flexible member, said fluid pressure signal being operably connected to apply a pressure to said second chamber and to the surface of the flexible member that is retained within said last mentioned chamber thereby to increase the pressure of the compressible fluid against said transmitting means when the magnitude of said fluid pressure is changed.

4. An apparatus to convert a fluid pressure signal into a measurable electric value that is proportional to said signal, comprising an elongated radiant energy conducting member having first and second ends and a peripheral side wall, a substantially constant radiant energy emitting means to direct radiant energy at said first end of said member for transmission therethrough, a detecting means operably connected to a null balance instrument to measure the radiant energy passing out of said second end of said member, a first chamber having a wall portion spaced apart from and surrounding a peripheral portion of said member, a flexible chamber, a passageway between said two chambers, a compressible fluid of a predetermined density retained within said first chamber, the passageway and said flexible chamber, means operable to apply a change in the magnitude of the fluid pressure signal to said flexible chamber to alter the pressure that is applied by said compressible fluid against the outer peripheral surface portion of said member to thereby effect a change in the density of said compressible fluid, and said changes in the density of said compressible fluid being effective to alter the quantity of radiant energy passing out of the member to said detecting means to a value that is directly proportional to the change in the magnitude of the fluid pressure signal.

5. An apparatus to convert a fluid pressure signal into a measurable electric value that is a function of said signal, comprising a radiant energy conducting member, a radiant energy emitting means to direct radiant energy through and out of said member, a first means to measure the radiant energy that is passed through and out of said member, a first chamber containing a compressible fluid of a predetermined density in contact with said member, said first chamber being provided with a flexible means that is operably connected to form a flexible wall portion thereof, the flexible wall portion providing a surface against which the fluid pressure signal being measured is applied to compress or allow the expansion of said compressible fluid and to thereby change the amount of radiant energy refracted from said member to said compressible fluid, and the changes in the compression and expansion of the compressible fluid being effective to change the radiant energy being measured by said first means to a value that is a function of the magnitude of said fluid pressure signal.

6. A fluid pressure to electric signal converting apparatus, comprising, a radiant energy source, a transmitting means into and through one end of which radiant energy is transferred from the radiant energy source, an electrical radiant energy measuring means positioned at an opposite end of the transmitting means responsive to radiant energy passing therethrough, a compressible fluid, a compressible means connected to apply the compressible fluid to a portion of said transmitting means, a chamber into which the fluid pressure to be converted is applied to said compressible means, the application of the fluid pressure being operable to vary the pressure at which the compressible fluid is compressed against the transmitting means and thereby alter the quantity of the emitted radiant energy that is lost, due to changes occurring in absorption and index of refraction of the compressible fluid, to a value that is a function of said applied fluid pressure.

7. The converting apparatus as defined in claim 6 wherein said compressible means is a flexible bellows and said compressed fluid is carbon dioxide.

8. An apparatus to measure the magnitude of a fluid pressure in terms of the absorption and index of refraction characteristics of a compressible fluid, comprising an elongated radiant energy conducting member, emitting means to direct radiant energy into and through said member, a means to indicate the radiant energy that passes out of said member, a first chamber to retain a compressible fluid in contact with a radiant energy transmitting portion of said member, said first chamber being provided with a flexible means that is operably connected to form a flexible wall portion thereof, a second chamber surrounding the flexible means, and an inlet in said second chamber through which the fluid pressure of varying magnitude is applied to compress or expand said compressible fluid in said first chamber to thereby increase or decrease the radiant energy absorption and index of refraction characteristic of said compressible fluid.

9. The apparatus as defined in claim 8 wherein said means to indicate the radiant energy that is passing out of said member is comprised of a thermopile and a null balance instrument connected thereto and said conducting member is made of a sapphire material.

10. An apparatus to convert a fluid pressure signal into a measurable electric value that is proportional to said signal, comprising an elongated radiant energy conducting member having first and second ends and a peripheral side wall, a radiant energy emitting means to direct radiant energy at said first end of said member, a detecting means operably connected to a null balance instrument to measure the radiant energy passing out of said second end of said member, a housing surrounding a peripheral portion of said member, said housing having a wall portion thereof spaced from said member, a compressible fluid of a predetermined density retained within said housing, an aperture forming a passageway in said wall portion, a flexible chamber connected to a part of the wall portion that surrounds the aperture, said flexible wall providing a surface against which the fluid pressure signal is applied to thereby alter the density condition of the compressible fluid as the magnitude of the fluid pressure signal is changed.

11. A transducing apparatus to convert the magnitude of an input fluid pressure signal into a measurable electric signal, comprising a light guide rod, a light source, said rod being operably positioned with respect to said source to transmit a substantially constant amount of light applied by said source against one of its ends, an electrical light measuring means positioned adjacent the other end of the rod and being responsive to light emanating therefrom, a first chamber surrounding an intermediate portion between the ends of said rod and having a wall portion spaced from the outer peripheral portion of said rod, a flexible chamber operably connected by way of a passageway to said first chamber, a compressible gas within said chambers and passageway, an additional chamber surrounding and spaced from said flexible chamber, and a passageway connected to said additional chamber for applying an increase in the magnitude of the input fluid pressure signal to simultaneously compress the flexible chamber in a direction toward and the compressible gas against the peripheral side wall portion of the rod to thereby effect an increase in the amount of light refracted from said rod through its outer peripheral side wall portion in to said compressible gas, and a decrease in the magnitude of the input signal applied by way of said last-mentioned passageway to said additional chamber being effective to allow the compressible gas and the flexible chamber to expand away from the peripheral portion of the rod to effect a decrease in the amount of light refracted from said rod through its outer peripheral portion into said compressible gas.

12. Apparatus to measure the magnitude of a fluid pressure signal comprising, an elongated light conducting member having first and second ends and a peripheral side wall, a light emitting means to direct light into said first end and through said member, a first chamber having a flexible wall, said first chamber being operable to retain a compressible gas of a lower index of refraction than said member in contact with a portion of the peripheral side wall of said member, a second chamber surrounding the flexible wall into which chamber the fluid pressure signal to be measured is applied to vary the compressed state of the gas directly in accordance with the magnitude of the applied fluid pressure signal, and a light responsive means positioned at the second end of the member to indicate changes in the intensity of light passing through the second end of said member.

13. A transducing apparatus to convert the magnitude of an input fluid pressure signal into a measurable electric signal comprising, a light conducting rod, a light emitting means to direct light into and through a first end of the rod, a detector positioned at a second end of the rod responsive to the intensity of light passing out of the second end of the rod, a first chamber having a flexible wall portion spaced from a portion intermediate the ends of the rod, a compressible fluid within said first chamber, a second chamber surrounding and spaced from said first chamber, and a fluid passageway means to apply the fluid pressure input signal to said second chamber and flexible wall contained therein to thereby vary the pressure of the compressible fluid in accordance with the magnitude of the applied fluid pressure signal.

14. The transducing apparatus defined by claim 13 wherein a heating coil positioned within the inner wall of the first chamber and a temperature controller unit electrically connected to the coil and to a temperature responsive means positioned in the first chamber are employed to continuously maintain the temperature of the compressible fluid constant as the pressure of the compressible fluid is varied with changes in the applied fluid pressure signal.

References Cited in the file of this patent

UNITED STATES PATENTS

| | | |
|---|---|---|
| 2,536,025 | Blackburn | Jan. 2, 1951 |
| 2,569,127 | Eltenton | Sept. 25, 1951 |
| 2,680,446 | Bendler | June 8, 1954 |
| 2,775,160 | Foskett et al. | Dec. 25, 1956 |
| 2,847,899 | Walsh | Aug. 19, 1958 |

FOREIGN PATENTS

| | | |
|---|---|---|
| 476,360 | Germany | May 15, 1929 |

OTHER REFERENCES

Karrer et al.: "A Photoelectric Refractometer," Journal of the Optical Society of America, vol. 36, No. 1, Jan. 1946, pages 42–46.